Oct. 27, 1931.  J. G. LOVELL  1,828,743
BODY FRAME
Filed July 8, 1929
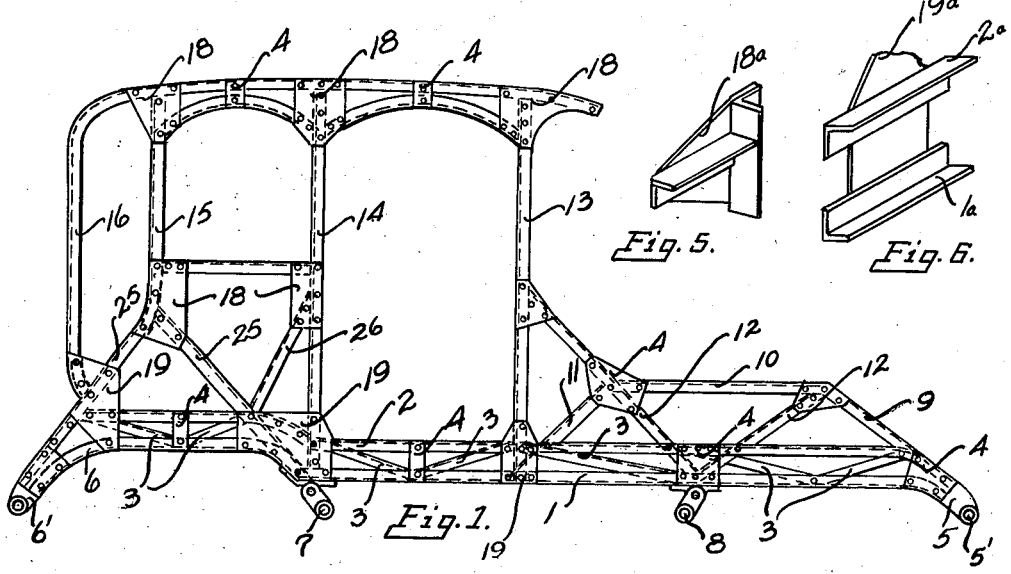
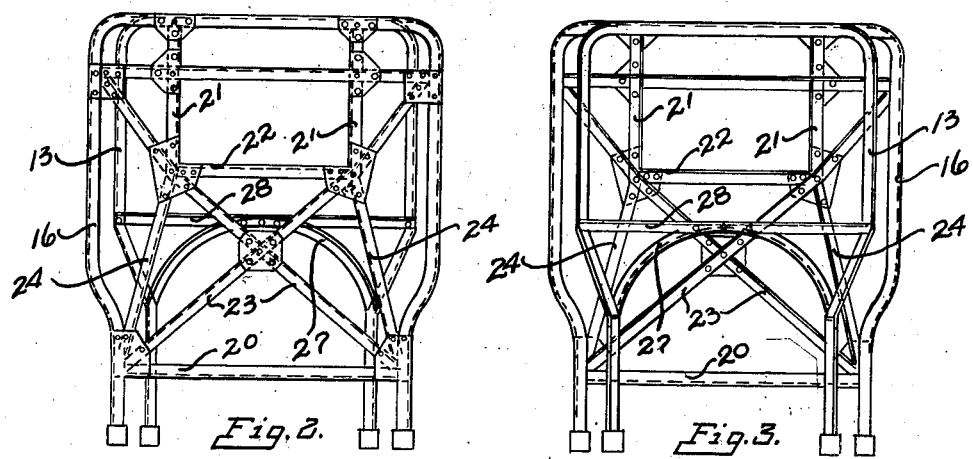
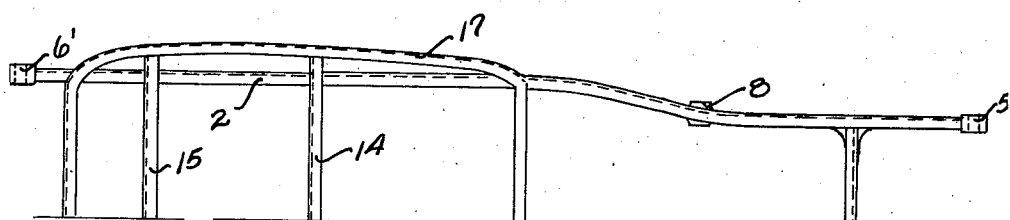
JOHN G LOVELL  Inventor
By Herbert E Smith
Attorney Patented Oct. 27, 1931

1,828,743

UNITED STATES PATENT OFFICE

JOHN G. LOVELL, OF SPOKANE, WASHINGTON

BODY FRAME

Application filed July 8, 1929. Serial No. 376,562.

My present invention relates to improvements in body frames for automotive vehicles, and particularly to the frames for passenger automobiles. The primary object of my invention is the provision of a frame or structure that includes the chassis and superstructure or body frame of an automobile, which frame will insure safety against breaking or crumbling of the body or of the top of the vehicle in case of accident where the weight of the automobile falls upon the top structure. The parts of the frame are also joined in such manner as to eliminate squeaks or noises produced by friction between parts due to loosening of the connected parts. And the entire structure, comprising the chassis and the superstructure supported thereon, is braced and reinforced by the co-operation of parts to assure a stable, rugged, and durable frame structure, which at the same time is comparatively light in weight. In carrying out my invention I utilize all metal parts fashioned from suitable materials and standardized as to sizes and shapes in order that the structure my be fabricated with facility and accuracy.

The invention consists in certain novel combinations and arrangements of parts as will hereinafter be more fully set forth and claimed. In the accompanying drawings I have illustrated one complete example of the physical embodiment of my invention in the form of a body frame for a coupe type or style of automobile, but it will be understood that the frame may be embodied in other types or models of automobiles. As herein illustrated the parts are combined and arranged according to one mode I have thus far devised for the practical application of the principles of my invention.

Figure 1 is a view in side elevation of the chassis and superstructure forming the combined body frame according to my invention.

Figure 2 is a view in rear elevation of the frame, and Figure 3 is a front elevation of the frame. Figure 4 is a top plan view showing one-half of the frame, which is divided longitudinally, it being understood of course that the right half (not shown) is complementary to the left half that is shown.

Figures 5 and 6 are perspective detail views showing welded joints between frame parts and joint plates.

The two side beams that constitute the chassis portion of the body frame, and upon which the body or superstructure is supported, each comprise a pair of vertically arranged, longitudinally extending bars 1 and 2, preferably fashioned from angle iron bars, and these vertically spaced bars are joined by diagonal braces 3 that are of suitable length and are present throughout substantially the length of the two beams. The ends of the diagonal braces in the side beams are riveted to the bars of the beams and also to tie plates 4 to insure a rigid or semi-rigid side beam, and the beams terminate in downwardly curved horns 5 and 6 at the front and rear of the chassis having bolt holes 5' and 6' for suspending the front and rear, longitudinally extending springs (not shown). The side beams diverge outwardly from front to rear, as usual, and at suitable intermediate points spring shackles 7 and 8 are pivoted at the undersides of the beams for the adjoining ends of the side springs.

At the front portion of the chassis, which is usually covered by the hood, each side beam is provided with a longitudinally extending truss member which includes the forward diagonal 9, the upper horizontal bar 10, a rear diagonal 11, and a V-shaped brace made up of the two bars 12, 12, the whole truss having joint plates 4 to which the connected parts are riveted, and the truss being mounted as shown above the top member of the side beam. These trusses not only strengthen the forward parts of the side beams and provide the support for the hood, but they also anchor the body and its roof against strains and stresses that would tend to push or pull the body and roof to the rear, due to vibrations when the vehicle is travelling forward. The trusses also acts against stresses or strains imposed on the body frame from the rear.

The body frame is made up of four inverted U-bars 13, 14, and 15, 16 and the roof frame 17, the U-bar 13 being located at the front of the body, the bar 16 at the rear of the body, and the two intermediate bars 14 and 15 being spaced therebetween to provide for the door opening and the window opening at the sides of the car body. The U-bars that extend transversely of the vehicle are joined to the roof frame by tie plates 4 and anchoring plates 18, rivets being used for securing the joined parts together. At their lower ends these transverse U-bars are secured as by anchoring plates 19 to the respective side beams 1 and 2 of the frame structure, and cross braces 20 join the side bars of the respective U-members.

A rear window opening is provided for by means of the pair of spaced vertical bars 21, 21, the horizontal brace 22, and the diagonal cross braces 23, the whole being strengthened by lateral bars 24, as best seen in Figure 1.

A triangular wheel-section of the frame is provided at each side of the body frame, located directly above the rear axle, and fashioned from angularly disposed bars 25 25 that rise from the side beams at points above the spring suspension points, and are joined by anchoring plates as 18 with the side frame of the body portion, and short diagonal brace bars 26 join the triangular wheel-sections with the intermediate inverted U-bar 14.

The legs of the front U-bar 13 are strengthened by a transversely extending, semi-circular, arch bar 27 to brace the superstructure across the cowl portion of the automobile and the ends of the arch bar are riveted to the legs of the U-bar while the upper part of the arch is riveted to a transverse brace bar 28 as best seen in Figure 3.

In Figure 5 the anchoring plate 18a is shown as welded to two joined bars, while in Figure 6 the bars 1a and 2a of a side beam are welded to the anchoring plate 19a, as distinguished from the joints in the other views of the drawings where rivets are utilized for securing the jointed parts.

As herein shown and described it will be apparent that the chassis and superstructure forming the body frame, or skeleton frame for the vehicle, comprises a combination of elements that is braced and reinforced to insure a rigid or semi-rigid structure in which the parts are joined in such manner as to eliminate loosening of parts with consequent squeaks, and to provide a strong, durable, but comparatively light body frame structure.

Having thus fully described my invention, what I claim as new and desire to secure by Letters Patent is:

A combined chassis and body frame comprising a pair of side beams, said beams each consisting of a pair of vertically spaced, longitudinal bars extending the full length of the chassis, down-turned horns forming the front and rear terminals of said beams, a plurality of inverted U-bars mounted transversely of the beams at the rear portion of the chassis, a roof frame on the U-bars, a longitudinally extending truss mounted on the forward part of each side beam, and braces connecting said trusses with the forward U-bar.

In testimony whereof I affix my signature.

JOHN G. LOVELL.